United States Patent [19]

Matsuda et al.

[11] Patent Number: 5,698,437
[45] Date of Patent: *Dec. 16, 1997

US005698437A

[54] AGENT FOR PROMOTING THE PROLIFERATION OF BIFIDOBACTERIUM

[75] Inventors: Isao Matsuda, Itami; Mitsuko Satouchi, Takarazuka, both of Japan

[73] Assignee: Matsutani Chemical Industry Co., Ltd., Hyogo-ken, Japan

[*] Notice: The term of this patent shall not extend beyond the expiration date of Pat. No. 5,380,717.

[21] Appl. No.: 359,826

[22] Filed: Dec. 20, 1994

[30] Foreign Application Priority Data

Dec. 20, 1993 [JP] Japan ................. 5-345441

[51] Int. Cl.$^6$ .................. C12N 1/20; A23G 9/00; A23C 17/00
[52] U.S. Cl. ................. 435/244; 426/101; 426/71; 435/252.1; 435/243
[58] Field of Search ................. 426/101, 71, 243; 435/244, 822, 252.1

[56] References Cited

U.S. PATENT DOCUMENTS

| | | | |
|---|---|---|---|
| 5,198,363 | 3/1993 | Takeuchi et al. | 435/277 |
| 5,364,652 | 11/1994 | Ohkuma et al. | 426/549 |
| 5,380,717 | 1/1995 | Ohkuma et al. | 514/58 |

FOREIGN PATENT DOCUMENTS

| | | |
|---|---|---|
| 0443788 | 8/1991 | European Pat. Off. |
| 530111 | 3/1993 | European Pat. Off. |
| 331294 | 2/1991 | Japan . |
| 4135495 | 5/1992 | Japan ................. C12P 19/20 |

OTHER PUBLICATIONS

Chemical Abstract, vol. 115, No. 7, Abstract No. 72139, Abstract of JP-A-03-031294, Aug. 19, 1991.

Derwent Publications Ltd., Apr. 20, 1993, Abstract No. 93-163576, Abstract of JP-A-05 095 768.

Patent Abstracts of Japan, vol. 15, No. 345, (C-864) [4873], Abstract of JP-A-03-137102, Sep. 3, 1991.

Derwent Publication Ltd., Nov. 29, 1988, Abstract No. 89-013531, Abstract of JP-A-63 291 588.

*Primary Examiner*—John W. Rollins
*Assistant Examiner*—Deborah K. Ware
*Attorney, Agent, or Firm*—Sughrue, Mion, Zinn, Macpeak & Seas, PLLC

[57] ABSTRACT

An agent for promoting the proliferation of Bifidobacterium which comprises an indigestible substance which is prepared by heating a starch in the presence of a mineral acid and a small amount of water to prepare a pyrodextrin and hydrolyzing the pyrodextrin in the presence of an acid; and use of the indigestible substance for promoting the proliferation of Bifidobacterium in the intestine. Foods containing the indigestible substance promote the proliferation of Bifidobacterium in the intestine and can be very excellent health foods.

10 Claims, No Drawings

AGENT FOR PROMOTING THE PROLIFERATION OF BIFIDOBACTERIUM

BACKGROUND OF THE INVENTION

The present invention relates to an agent for promoting the proliferation of Bifidobacterium which comprises an indigestible substance which is prepared by heating a starch in the presence of a mineral acid and a small amount of water to prepare a pyrodextrin and hydrolyzing the pyrodextrin in the presence of an acid; use of the indigestible substance for promoting the proliferation of Bifidobacterium in the intestine; and a method for imparting Bifidobacterium proliferation-promoting effect on a food by adding the indigestible substance to the food.

A hundred kinds of bacteria and a hundred trillions of bacterial cells live in the human intestine and form an intestinal bacterial flora. These bacteria proliferate while ingesting dietary components and components secreted in the intestine as nutrients and produce various kinds of substances. The intestinal bacterial flora varies depending on the age of a subject or as one gets older. For instance, Bifidobacterium is predominant in the suckling, while anaerobics such as Bacteroidaceae appear in the weaning period and bacteria form bacterial flora similar to that observed in the adult. On the other hand, an abnormal bacterial flora, which is not observed in the normal adults, often appears in the aged. More specifically, there is observed a decrease in the population of Bifidobacterium and an increase in the population of other bacteria such as *Escherichia*, *Enterococcus* and *Clostridium perfringens*. It has been known that such a change in the intestinal bacterial flora exerts various adverse effects on the human body and accordingly, it has been believed to be important that the population of the intestinal bacteria should be maintained at a condition in which Bifidobacterium is numerically superior to harmful bacteria such as *Clostridium perfringens*.

Recently, there have been developed various kinds Bifidobacterium-containing pharmaceutical preparations and dairy products containing the same for the purpose of increasing the population of Bifidobacterium in the intestine. However, it has generally been believed that the bacterial cells of Bifidobacterium orally administered hardly settle in the human body. For this reason, it would be effective to orally ingest an indigestible saccharide-containing food which can arrive at the large intestine without being digested and absorbed and are used by Bifidobacterium therein in order to increase the population of Bifidobacterium in the intestine.

Nevertheless, most of indigestible polysaccharides such as cellulose and insoluble dietary fibers such as lignin can arrive at the large intestine, but are not ingested by the intestinal bacteria. On the other hand, water-soluble dietary fibers such as pectin and guar gum are partially ingested by the intestinal bacteria, but do not preferentially promote the proliferation of Bifidobacterium. Moreover, Bifidobacterium can ingest oligosaccharides such as fructo-oligosaccharide, soybean oligosaccharide and isomalto-oligosaccharide in the large intestine, but these sugars are not preferentially ingested by Bifidobacterium, are limited in the kinds of foods into which they can be incorporated because of low resistance to heat and acids, are expensive because of a high production cost and it is difficult to continuously ingest everyday.

Regarding the acid-hydrolysis of pyrodextrin, Japanese Unexamined Patent Publication (hereunder referred to as "J.P. KOKAI") No. Hei 4-135495 discloses a method comprising the steps of pressure heating an aqueous solution of inorganic acid-added pyrodextrin (i.e., the pyrodextrin which is prepared by heating a starch in the presence of a mineral acid and a small amount of water) to which an inorganic or organic acid is optionally added, then neutralizing the solution to give an acid-hydrolyzate having a content of generated glucose of about 10%, acting glucoamylase on the solution to thus saccharify the dextrin into indigestible polysaccharides and digestible saccharides and then separating the indigestible polysaccharides. It further discloses that the indigestible polysaccharides are used in the alimentotherapy for persons who are limited in the calorie intake and intake of saccharides because of their low viscosity and low calorie and that they are used as raw materials for foods, i.e., dietary fibers for keeping human health. However, this patent does not disclose any correlation between the indigestible components and the DE value or the molecular weight thereof and does not likewise disclose the Bifidobacterium-proliferation activity thereof at all.

SUMMARY OF THE INVENTION

Accordingly, an object of the present invention is to provide an agent which shows a high preferential Bifidobacterium-proliferation activity.

A further object of the present invention is to provide a food which shows a high preferential Bifidobacterium-proliferation activity.

The inventors of this invention have conducted various studies to solve the foregoing problems associated with the conventional techniques, have found out that an acid-hydrolyzate of a specific pyrodextrin exhibits a preferential Bifidobacterium-proliferation activity which has not been observed prior to the acid-hydrolysis thereof, that if the average molecular weight of the indigestible components satisfy a specific requirement as will be detailed below, a substance whose Bifidobacterium-proliferation activity is particularly high can be obtained and that the substance shows general characteristic properties identical to those observed for starch syrup and starch syrup solid and can be used as one of ingredients for preparing various kinds of foods and thus have completed the present invention.

The present invention provides an agent for promoting the proliferation of Bifidobacterium which comprises an indigestible substance which is prepared by heating a starch in the presence of a mineral acid and a small amount of water to prepare a pyrodextrin and hydrolyzing the pyrodextrin in the presence of an acid.

The present invention provides use of the indigestible substance for promoting the proliferation of Bifidobacterium in the intestine.

Further, the present invention provides a method for imparting a Bifidobacterium proliferation-promoting effect to a food which comprises adding the indigestible substance to the food.

DESCRIPTION OF THE PREFERRED EMBODIMENTS

The present invention will hereunder be described in more detail.

Polysaccharides such as starches are hydrolyzed into monosaccharides and higher saccharides by the enzymes present in the living body, but only the monosaccharides are absorbed by the upper part of the digestive tract, while the higher saccharides arrive at the large intestine without being absorbed.

In the present invention, the components other than glucose, in other words the indigestible components which are obtained by hydrolyzing the pyrodextrin (which is prepared by heating a starch in the presence of a mineral acid and a small amount of water and which is referred to as "acid-added pyrodextrin") in the presence of an acid arrive at the upper part of the large intestine without being absorbed therein, in which they are used for the proliferation by Bifidobacterium.

The raw pyrodextrin (i.e., acid-added pyrodextrin) is prepared by adding an inorganic acid to starch and heating the mixture under a low moisture condition. More specifically, the pyrodextrin is prepared by heating a starch in the presence of 1% by weight hydrochloric acid in the amount of 3 to 10% weight and water in the amount of 0.1 to 7% by weight at a temperature of 140° to 200° C. for 10 to 120 minutes. The pyrodextrin preferably contains indigestible components in an amount of 30 to 60% by weight.

Then, an inorganic or organic acid is added to an aqueous solution of the pyrodextrin and then the solution is hydrolyzed by pressure heating to give an acid-hydrolyzate. More specifically, the indigestible substance is prepared by hydrolyzing the pyrodextrin in the presence of an inorganic or organic acid such as hydrochloric acid or oxalic acid at a pH of 1.6 to 2.0 and at a temperature of 120° to 140° C. for 15 to 60 minutes.

Generally, the content of the indigestible components contained in the pyrodextrin ranges from 30 to 60% by weight. The average molecular weight of the indigestible components contained in the indigestible substance is not more than 1085. The acid hydrolyzate obtained from the pyrodextrin obtained from corn starch and containing indigestible components ranging from 30 to 60% by weight has a DE value ranging from 26 to 44% by weight. The indigestible components contained in the acid-hydrolyzate exhibits a preferential Bifidobacterium-proliferation activity. The indigestible substance used in the present invention may be in the form of the indigestible components contained in the acid-hydrolyzate or in the form of the acid-hydrolyzate containing both the indigestible components and digestible components such as glucose.

The agent of the present invention may consist of the indigestible components or may further comprise an appropriate carrier such as a food such as candy, caramel, chewing gum, cream filling, ice cream, jam, jelly, pudding, meringue, sherbet, (fruits) compote and marsh mallow.

Starches for preparing the pyrodextrin used in the present invention are not restricted to specific ones and specific examples thereof are starches derived from corn (maize), waxy corn (glutinous corn), potato, sweet potato, tapioca, wheat, barley and rice. The foregoing method will further be described in detail below.

A mineral acid (such as hydrochloric acid, nitric acid or sulfuric acid, preferably hydrochloric acid) is added to starch in an amount, for instance, 3 to 10% by weight as expressed in terms of a 1% by weight aqueous solution of hydrochloric acid per 100 parts by weight of the starch and the mixture is then heat-treated to give a pyrodextrin as an intermediate. To uniformly admix the starch and the aqueous solution of a mineral acid prior to the heat-treatment, they are preferably stirred and aged in an appropriate mixer and then pre-dried at a temperature preferably ranging from about 100° to 120° C. to thus reduce the moisture content of the mixture to about 0.1 to 7%, preferably about 2 to 5% by weight.

The heat-treatment is carried out under conditions of a temperature ranging from 140° to 200° C. for 2 to 120 minutes, preferably 10 to 120 minutes unlike those for the heat-treatment of acid-added pyrodextrin (white dextrin, yellow dextrin) used in the conventional techniques. The higher the temperature for the heat-treatment, the higher the content of the indigestible components in the intended product. However, if the temperature exceeds about 180° C., the content of colored substances increases and therefore, the temperature for the heat-treatment is more preferably about 150° C.

Alternatively, it is also possible to carry out a reaction at a high temperature for a short period of time by appropriately selecting a heating apparatus. For instance, the use of an apparatus capable of carrying out a uniform reaction within a very short time period (for example, 3 to 12 seconds) such as an extruder permits an efficient heat-treatment of starch. Moreover, since the reaction is performed in the powdery condition, it is necessary to change the heating conditions upon a large-scale production and therefore, it is desirable that the heating conditions be properly changed after inspecting the product obtained through the heat-treatment for the quality thereof.

The pyrodextrin thus prepared is easily soluble in water and accordingly, an aqueous solution thereof can easily be prepared by adding water and stirring the resulting mixture. The aqueous solution as such or the solution to which an acid, in particular, hydrochloric acid or oxalic acid is added to adjust the pH thereof to a level of 1.6 to 2.0 is hydrolyzed under pressure of 0 to 2.7 kgf/cm$^2$, preferably 1.0 to 2.7 kgf/cm$^2$ with a heating temperature ranging from 100° to 140° C., preferably 120° to 140° C. for 15 to 60 minutes. The acid-hydrolyzate thus prepared can be used as an ingestible substance of the present invention but preferably it may then be neutralized followed by decolorization, desalting and concentration in the usual manner to give a liquid product, or further spray-dried to give a powdery product which are used as an indigestible substance of the present invention.

In the present invention, the content of the indigestible components present in the pyrodextrin and in the acid-hydrolyzate is determined by the method as will be detailed below and varies depending on the added amount of an acid and the heating time. The pyrodextrin having indigestible components of 30 to 60% by weight is preferably used as a starting material of the acid-hydrolyzate. The pyrodextrin having indigestible components of not less than 60% by weight is severely colored and scorched and is not appropriate as a raw material for the acid-hydrolyzate used in the present invention.

On the other hand, the acid-hydrolyzate of the pyrodextrin is taken per day in the amount of preferably not less than about 4 g, more preferably about 5 to 10 g as expressed in terms of the amount of the indigestible components for ensuring the effect of the present invention. For this reason, when pyrodextrin having an indigestible component-content of not more than 30% by weight is used, only a small amount of the resulting acid-hydrolyzate can arrive at the large intestine and the acid-hydrolyzate must be ingested in a large amount to ensure a desired effect. This results in an increase in cost and the hydrolyzate can be incorporated into limited numbers of foods.

In the present invention, therefore, the use of starting pyrodextrin having a content of the indigestible components ranging from 30 to 60% by weight is preferable for ensuring the intended Bifidobacterium proliferation-promoting effect.

Then the pyrodextrin is hydrolyzed with an acid and this treatment leads to a reduction in the content of the indigestible components in the resulting hydrolyzate. In this respect, if the pyrodextrin obtained from corn starch and having a content of indigestible components ranging from 30 to 60% by weight is used, the content of indigestible components of the hydrolyzate would range from 26 to 44% by weight. Moreover, the DE value of the hydrolyzate as will be detailed below increases through the acid-hydrolysis. The hydrolyzate having a DE value preferably ranging from about 17 to 44 and more preferably about 28 to 39 exhibits a strong Bifidobacterium proliferation-promoting effect. In addition, if the average molecular weight of the indigestible components present in the acid-hydrolyzate is not more than 1085, preferably about 722 to 908, the acid-hydrolyzate shows a strong Bifidobacterium proliferation-promoting effect.

According to the present invention, the Bifidobacterium proliferation-promoting effect can be imparted to a food by adding the foregoing acid-hydrolyzate of the pyrodextrin or replacing a part of the ingredients of the food with the acid-hydrolyzate. The added amount of the hydrolyzate or the amount thereof to be replaced is preferably not less than about 4 g per meal as expressed in terms of the amount of the indigestible components thereof. In this respect, there are differences between individuals in the influence of the indigestible components on the physiological conditions and therefore, it is desirable to appropriately increase or decrease the amount thereof while monitoring the practical effect of the hydrolyzate on the individual physiological conditions.

The present invention will hereunder be explained in more detail with reference to the following Test Examples. The term "DE" used herein is the abbreviation of "Dextrose Equivalent" and an index widely used for expressing the degree of hydrolysis of a starch-hydrolyzate. More specifically, the reducing sugar is determined as dextrose and the ratio thereof to the solid content of the reducing sugar (assumed to be 100) is defined to be "DE". There have been known various methods for analyzing the reducing sugar, but the Willstaetter-Schudel method is used in the present invention. All of the terms "%" appearing in the following Tables means "% by weight".

Methods for quantitative determination and test methods used in the present invention will hereunder be detailed below.

[Quantitative Determination of Indigestible Components]

The content of the indigestible components present in the pyrodextrin and the indigestible substance was determined according to the method detailed below (the method disclosed in "Quantitative Determination of Indigestible Components", Starch Science, 1990, Vol. 37, No. 2, p. 107, which is modified to some extent).

An amount of 1 g of pyrodextrin or indigestible substance was accurately weighed out, 50 ml of a 0.05M phosphate buffer (pH 6.0) was added thereto and then 0.1 ml of α-amylase (Termamyl 120L available from Novo Nordisk Bioindustry Co., Ltd.; activity: 120 KNU/g) was added, followed by reaction of the mixture at 95° C. for 30 minutes. After cooling the reaction mixture, 0.1 ml of amyloglucosidase (No. A-3042 available from Sigma Company; activity: 6100 Unit/ml) whose pH was adjusted to 4.5 was added to the mixture, followed by reaction of the mixture at 60° C. for 30 minutes and then raising the temperature up to 90° C. to terminate the reaction. After the completion of the reaction, the reaction solution was filled up with water to 100 ml and the amount of glucose (B) (g) was determined by the pyranose-oxidase method. Separately, the amount of glucose (A) (g) present in the sample prior to the reaction was also determined in the same manner. Then the content (% by weight) of the indigestible components was calculated by the following relation:

Content of Indigestible Components (% by weight) = $[1-A-(B-A)\times 0.9]\times 100$ wherein A represents the amount of glucose (g) prior to the reaction and B represents the amount of glucose (g) after the reaction.

[Quantitative Determination of Glucose]

A sample (1 g) was accurately weighed out, introduced into a 100 ml graduated flask and dissolved in and filled up with distilled water to 100 ml. Then the solution was inspected for the amount of glucose by the pyranose-oxidase method (using Determinator GL-E available from Kyowa Medic Co., Ltd.).

[Method for Determining Average Molecular Weight]

The solution used in the determination of glucose was passed through a mixed-bed type ion-exchange resin column at a space velocity (SV) of 1.0 to desalt and the eluate was concentrated to a concentration of 5% by weight using a rotary evaporator to give a sample solution. The sample (20 μl) was subjected to liquid chromatography under the following conditions to determine the average molecular weight.

Column: Shodex Ionpak S-802-S-804. S-805. S-806

Eluent: water; flow rate 1 ml/min

Column Pressure: 40 Kg/cm$^2$

Column Temperature: 60° C.

Detector: RI

Data Processor: Hitachi D-2000 Type GPC Data Processor

Reference Sample: glucose, pullulan (having known molecular weights)

The average molecular weight of the sample was determined on the basis of the results obtained using the following equation.

$$\text{Average Molecular Weight} = \frac{\Sigma Hi}{\Sigma (Hi/Mi)} \times QF$$

wherein Hi represents the height of each peak, Mi represents the molecular weight of pullulan and QF represents the Q factor (Mark-Houwink's coefficient).

[Test on in vitro Assimilation by Bifidobacterium]

(1) Fildes Solution

To a 250 ml flask, there were added 150 ml of physiological saline, 6 ml of conc. HCl, 50 ml of horse serum and 1 g of pepsin (1:10000), followed by sufficient mixing, allowing to stand in a water bath maintained at 55° C. overnight to thus act the pepsin on the horse serum for digestion thereof. Then 12 ml of a 20% by weight NaOH solution was added to the mixture, the pH thereof was accurately adjusted to 7.6 with NaOH or HCl, 2 ml of chloroform was added and the resulting mixture was stored under refrigerated conditions.

(2) Salts Solution

There were dissolved, in 300 ml of purified water, 0.2 g of anhydrous $CaCl_2$ and 0.2 g of $MgSO_4$, followed by addition of 500 ml of purified water to the solution with sufficient stirring, addition of 1 g of $K_2HPO_4$, 1 g of KH$_2$PO$_4$, 10 g of NaHCO$_3$ and 12 g of NaCl, complete dissolution of these compounds, addition of additional 200 ml of purified water, mixing of these compounds and storage of the resulting solution at 4° C.

(3) BL Agar-Plate

Defibrinated horse serum (available from Kojin Co., Ltd.) was added to BL agar medium (available from Nissui Pharmaceutical Co., Ltd.) in an amount of 5 ml per 100 ml of the latter and about 15 to 20 ml of the resulting mixture was dispensed into each petri dish and used as an agar-plate.

(4) Fildes Solution-Added GAM Semifluid Agar Medium

To GAM Bouillon (available from Nissui Pharmaceutical Co., Ltd.), there were added 0.4% by weight of Fildes Solution and 0.15% by weight of agar and 4 ml of the resulting mixture was dispensed in each test tube.

(5) Cultivation of Strain to be Tested

A strain to be tested was streak-cultured on the BL agar plate and then an isolated colony was harvested. These operations were repeated twice to give a pure culture strain which was subcultured on the Fildes Solution-added GAM semifluid agar medium under cultivation conditions of a temperature of 37° C. and a cultivation time of 24 hours.

(6) PYF Semifluid Agar Medium

The pH value of a culture medium having the following composition was adjusted to 7.2.

| | |
|---|---|
| Trypticase | 10.0 g |
| Yeast Extract | 10.0 g |
| Fildes Solution | 40.0 ml |
| Salts Solution | 40.0 ml |
| L-Cysteine Hydrochloride Monohydrate | 0.5 g |
| Agar | 1.5 g |
| Purified Water | 920.0 ml |

(7) Anaerobic Cultivation and Estimation of Assimilation

Anaerobic cultivation of a strain was carried out using Anaerobic Incubator (available from SANYO/FORMA Company) in a mixed gas atmosphere comprising 10% by volume of CO$_2$, 10% by volume of H$_2$ and the balance of N$_2$. Whether the strain shows an ability of assimilating the acid-hydrolyzate or not and the degree of assimilation were evaluated on the basis of the extent of the pH drop observed after the cultivation according to the following evaluation criteria:

| pH Value | Assimilation |
|---|---|
| 6.0 ≦ pH | − |
| 5.5 ≦ pH < 6.0 | ± |
| 5.0 ≦ pH < 5.5 | + |
| 4.5 ≦ pH < 5.0 | ++ |
| pH < 4.5 | +++ |

−: no assimilation
±: slight assimiliation
+: fair assimilation
++: good assimilation
+++: very good assimilation

Test Example 1

Hydrochloric acid (670 ppm) was added to commercially available corn starch, then the mixture was pre-dried by a flash dryer till the moisture content thereof reached about 2 to 3% by weight and roasted at 140° to 145° C. for about 30 minutes in a rotary kiln to give dextrin having an indigestible component-content of 53%. A 1N sodium hydroxide aqueous solution was added to a 20% by weight solution of the pyrodextrin to adjust the pH thereof to 6.0, followed by addition of α-amylase (Termamyl 60L available from Novo Nordisk Bioindustry Co., Ltd.) in an amount of 0.2% by weight based on the pyrodextrin, hydrolysis at about 85° C. for 60 minutes, adjustment of the pH value to 4.5, addition of glucoamylase (Gluczyme NL-4 available from Amano Pharmaceutical Co., Ltd.) in an amount of 0.1% by weight based on the pyrodextrin, hydrolysis at about 55° C. for 24 hours, desalting with an ion-exchange resin and concentration of the desalted product to about 50% by weight. Then about 4 l of this solution was passed through a column of a continuous chromatograph (CCS-10-A Type available from Hitachi, Ltd.) packed with 10 l of XFS-43279 (available from Dow Chemical Japan Co., Ltd.) which was a strongly acidic cation-exchange resin converted into its sodium form, at 70° C. and SV of 0.3, then the column was eluted with water to remove glucose formed from the digestible component-fraction through the hydrolysis with glucoamylase, followed by additional purification with an ion-exchange resin, concentration of the resulting eluate and spray-drying of the concentrate to give an isolated sample of the indigestible components. A load test was carried out using the sample and 5 normal healthy volunteers to determine the digestion and absorption properties thereof in man. More specifically, the blood concentration of sugar (blood-sugar level) and the blood-insulin level were determined with the lapse of time. The results thus obtained are summarized in the following Table 1.

TABLE 1

| Elapsed Time (min) | Blood-Sugar Level (mg/dl) | Insulin Level (μU/ml) |
|---|---|---|
| 0 | 83 ± 0.1 | 5.0 ± 0.1 |
| 30 | 84 ± 0.1 | 6.0 ± 0.1 |
| 60 | 83 ± 0.1 | 5.0 ± 0.1 |
| 90 | 82 ± 0.1 | 4.8 ± 0.1 |
| 120 | 81 ± 0.1 | 4.0 ± 0.1 |

The data listed in Table 1 indicate that the indigestible components present in the pyrodextrin have almost no effect on the blood-sugar level and the blood-insulin level. This means that the indigestible components are scarcely digested and absorbed. Therefore, it is believed that, if the pyrodextrin is ingested, only the indigestible components thereof arrive at the large intestine without digestion and assimilated by the intestinal bacteria. It can accordingly be considered that the higher the content of the indigestible components, the higher the Bifidobacterium proliferation-promoting effect.

Test Example 2

Various starch products (corn starch, potato starch, waxy corn starch, rice starch) each was mixed with hydrochloric acid, followed by homogenization, pre-drying of each mixture till the moisture content thereof reached about 2 to 3% by weight and then roast of the pre-dried mixtures in an oil bath to give 4 kinds of pyrodextrin products. These pyrodextrin products and two kinds of commercially available pyrodextrin products (derived from corn starch and potato starch respectively) were inspected for the content of the indigestible components. The results thus obtained are summarized in the following Table 2 together with conditions for roasting.

TABLE 2

| Raw Starch | Amount of HCl Added (ppm) | Roasting Temp. (°C.) | Heating Time (min) | Indigestible Comp. (%) |
|---|---|---|---|---|
| Corn Starch | 750 | 160 | 18 | 50.1 |
| Potato Starch | 750 | 175 | 120 | 54.9 |
| Waxy Corn Starch | 500 | 175 | 15 | 57.3 |
| Rice Starch | 1000 | 175 | 60 | 53.4 |
| Corn Starch*1 | — | — | — | 24.6 |
| Potato Starch*2 | — | — | — | 16.8 |

*1, *2: Commercially available starch products.

Then a 20% by weight solution of each pyrodextrin listed in Table 2 was subjected to pH adjustment, α-amylase hydrolysis, glucoamylase hydrolysis and a treatment with an ion-exchange resin in the same manner used in Test Example 1, followed by concentration and spray-drying to give six kinds of samples A, B, C, D, E and F of the corresponding indigestible components.

The population of the kinds of strains belonging to Bifidobacteria varies as aging of the human being, but *Bifidobacterium longum* is widely detected in every age brackets over sacklings, infants, adults and old people. For this reason, an in vitro assimilation test was carried out using this bacterium. Each sample prepared above and glucose as an optional component (control was free of glucose) were added to PYF semifluid agar medium so that the final concentrations thereof were equal to 0.5% by weight, respectively and then subjected to an autoclave sterilization at 115° C. for 20 minutes to give each test medium. On 1.5 ml of each test medium, there was inoculated 0.03 ml of the culture medium of Bifidobacterium, subjected to anaerobic cultivation at 37° C. for 96 hours, followed by determination of the pH value of each culture medium to evaluate the assimilation of each sample by the Bifidobacterium. The results thus obtained are listed in the following Table 3.

TABLE 3

| Sample | Indigestible Components (%) | Ability of Assimilation |
|---|---|---|
| Control | — | — |
| glucose | — | +++ |
| A | 50.1 | — |
| B | 54.9 | — |
| C | 57.3 | — |
| D | 53.4 | — |
| E | 24.6 | ± |
| F | 16.8 | ± |

As seen from the data listed in Table 3, the insufficiently roasted sample having the content of indigestible components of not more than 25% by weight was slightly assimilated by *Bifidobacterium longum* and the pyrodextrin having the content of indigestible components of more than 50% by weight was not assimilated at all. This result accordingly shows that the indigestible components present in the pyrodextrin having a practically acceptable content of indigestible components, i.e., not less than 30% by weight do not exhibit Bifidobacterium-proliferation activity.

Test Example 3

Corn starch was roasted under the conditions listed in Table 4 in the same manner used in Test Example 2 to give 4 kinds of pyrodextrin samples G, H, I and J different from one another in indigestible components.

TABLE 4

| Sample | Amount of HCl Added (ppm) | Roasting Temp. (°C.) | Heating Time (min) |
|---|---|---|---|
| G | 750 | 160 | 49 |
| H | 750 | 160 | 18 |
| I | 750 | 160 | 7 |
| J | 750 | 160 | 2 |

Each of these pyrodextrin was dissolved in a 0.2N hydrochloric acid solution, hydrolyzed for 20, 40 or 60 minutes in a boiling water bath of 100° C. and neutralized. Separately, each pyrodextrin prior to the hydrolysis was also neutralized. Then these neutralized products were inspected for the DE value and the content of indigestible components. Then these products each was treated in the same manner used in Test Example 2 to isolate the indigestible components. The resulting 16 samples in all were subjected to the assimilation-evaluation test in the same manner used in Test Example 2 and at the same time the average molecular weight of each sample of the indigestible components (referred to as "I.D. Comp." in the following Tables) was determined. These results are summarized in the following Table 5.

TABLE 5

| | Pyrodextrin | | Acid-Hydrolyzate of Pyrodextrin | | | |
|---|---|---|---|---|---|---|
| Sample | I.D. Comp. (%) | Hydrolysis Time (min) | DE after Hydrolysis | I.D. Comp. (%) | $(MW)_{av}$ of I.D. Comp. | Ability of Assimilation |
| G | 60.2 | 0 | 8.2 | 60.2 | 1491 | — |
| | | 20 | 16.9 | 46.8 | 1163 | — |
| | | 40 | 29.7 | 43.5 | 963 | + |
| | | 60 | 32.4 | 42.9 | 872 | ++ |
| H | 50.1 | 0 | 8.0 | 50.1 | 1293 | — |
| | | 20 | 18.0 | 42.3 | 1083 | ± |
| | | 40 | 32.7 | 39.7 | 908 | ++ |
| | | 60 | 36.2 | 35.8 | 825 | +++ |
| I | 40.0 | 0 | 7.6 | 40.0 | 1295 | — |
| | | 20 | 17.2 | 37.6 | 1085 | ± |
| | | 40 | 28.0 | 34.6 | 884 | ++ |
| | | 60 | 38.5 | 32.7 | 760 | +++ |
| J | 31.6 | 0 | 7.2 | 31.6 | 1157 | — |
| | | 20 | 16.7 | 30.3 | 1024 | ± |
| | | 40 | 29.6 | 27.6 | 834 | ++ |
| | | 60 | 36.3 | 26.6 | 722 | +++ |

The data listed in Table 5 clearly indicate that the pyrodextrin having an indigestible component-content ranging from 31.6 to 60.2 did not show any Bifidobacterium-proliferation activity, but the acid-hydrolyzate of the pyrodextrin exhibited Bifidobacterium-proliferation activity. Moreover, the data further indicate that the acid-hydrolyzates comprising indigestible components whose average molecular weight was not more than 1085, preferably about 722 to 908 still containe a practically sufficient amount of the indigestible components and show a strong Bifidobacterium-proliferation activity. The data also show that the acid-hydrolyzates of pyrodextrin having a DE value ranging from about 17 to 44 exhibit Bifidobacterium-proliferation activity and that the acid-hydrolyzate having a DE value of not more than 18 show a slight Bifidobacterium-proliferation activity, while those having a DE value ranging from about 28 to 39 exhibit a strong Bifidobacterium-proliferation activity.

Test Example 4

Each of the pyrodextrin products prepared in Test Example 2 and derived from potato starch, waxy corn starch and rice starch was used to form a 30% by weight solution, followed by adjustment of the pH value to 1.9 with a 0.2N HCl solution and then hydrolysis at 121° C. and 1.1 Kgf/cm² for 60 minutes in an autoclave. The resulting 3 kinds of samples each was neutralized and then inspected for the DE value and the content of indigestible components. The results thus obtained are summarized in the following Table 6.

TABLE 6

| Raw Starch | DE value | Content of I.D. Comp. (%) |
|---|---|---|
| Potato Starch | 29.0 | 49.5 |
| Waxy Corn Starch | 27.2 | 50.3 |
| Rice Starch | 25.7 | 48.4 |

These 3 kinds of the pyrodextrin acid-hydrolyzates were subjected to pH adjustment, alpha-amylase hydrolysis, glucoamylase hydrolysis and ion-exchange resin chromatography in the same manner used in Test Example 1 to give 3 kinds of samples K, L and M of the indigestible components. These samples K, L and M were subjected to the same assimilation-evaluation test used in Test Example 2. The results thus obtained are listed in the following Table 7.

TABLE 7

| Sample | Ability of Assimilation |
|---|---|
| Control | − |
| Glucose | +++ |
| K | + |
| L | + |
| M | + |

The results listed in Table 7 indicate that the acid-hydrolyzates of pyrodextrin products derived from starch other than corn starch likewise contain a practically sufficient amount of indigestible components and exhibit Bifidobacterium-proliferation activity.

Test Example 5

Hydrochloric acid (670 ppm) was added to commercially available corn starch, followed by uniform mixing and heat-treatment at a temperature ranging from 140° to 145° C. for 30 minutes to give a pyrodextrin product having an indigestible component-content of 51.5% by weight. The pyrodextrin thus prepared was dissolved in water to give a 30% solution. The aqueous solution was divided into two parts to which 0.2N hydrochloric acid was added to adjust pH to 1.9 and 1.6 respectively and heated at about 127° C. and at 1.5 Kgf/cm² for 20 minutes to give two samples each having DE value of 23.6 or 33.0 and an ingestible component-content of 43.7% or 43.5% by weight. These acid-hydrolyzed pyrodextrins were subjected to an enzymatic hydrolysis and removal of glucose in the same manner used in Test Example 2 to give two samples N and O of indigestible components. These samples N and O were subjected to intensive assimilation-evaluation tests.

The following strains were used in the assimilation-evaluation tests: Bacteroides (13 strains); Bifidobacterium (18 strains); Clostridium (25 strains); Eubacterium (6 strains); Fusobacterium (3 strains); peptostreptococcus (4 strains); Lactobacillus (9 strains); Enterococcus (5 strains); Escherichia coli (5 strains); and other 18 strains.

Each sample prepared above and glucose were added to PYF semifluid agar medium, as in Test Example 1, so that the final concentrations thereof were equal to 0.5% by weight and then subjected to an autoclave sterilization at 115° C. for 20 minutes to give each test medium, followed by cultivation of the foregoing strains to thus evaluate the ability of assimilation of these samples. The results thus obtained are listed in the following Table 8.

TABLE 8-1

| Name of Bacterium | Strain Used | Control | Glucose | N | O |
|---|---|---|---|---|---|
| *Bacteroides* | | | | | |
| distasonis | GAI# 5462 | − | + | ± | ± |
| fragilis | GAI# 5524 | − | + | + | + |
| fragilis | GAI# 5562 | − | ++ | + | + |
| fragilis | CIFL N0058 | − | ++ | + | + |
| intermedius | CIFL N0074 | − | + | ± | + |
| ovatus | JCM 5824 | − | + | + | + |
| ovatus | CIFL N0029 | − | + | + | + |
| thetaiotaomicron | GAI# 5628 | − | + | + | + |
| thetaiotaomicron | CIFL N0106 | − | + | + | ++ |
| uniformis | GAI# 5466 | − | + | + | + |
| vulgatus | GAI# 5460 | − | ++ | ± | + |
| vulgatus | CIFL N0107 | − | ++ | ± | + |
| vulgatus | CIFL N0109 | − | ++ | ± | + |
| *Bifidobacterium* | | | | | |
| adolescentis | CIFL N0035 | − | +++ | − | +++ |
| adolescentis | CIFL N0037 | − | +++ | ++ | +++ |
| adolescentis | CIFL N0038 | − | +++ | ++ | +++ |
| adolescentis | CIFL N0046 | − | +++ | ++ | +++ |
| adolescentis | CIFL N0077 | − | +++ | ± | ++ |
| animalis | CIFL N0040 | − | +++ | − | ± |
| bifidum | CIFL N0067 | − | +++ | − | − |
| bifidum | CIFL N0089 | − | +++ | − | − |
| breve | CIFL N0055 | − | +++ | ± | +++ |
| breve | CIFL N0078 | − | +++ | + | +++ |
| breve | CIFL N0088 | − | +++ | − | ++ |
| breve | CIFL N0110 | − | +++ | ++ | +++ |
| infantis | CIFL N0050 | − | +++ | − | + |
| longum | CIFL N0036 | − | +++ | − | + |
| longum | CIFL N0044 | − | +++ | + | ++ |
| longum | CIFL N0051 | − | +++ | + | ++ |
| longum | CIFL N0052 | − | +++ | ± | + |
| longum | CIFL N0057 | − | +++ | + | ++ |

TABLE 8-2

| Name of Bacterium | Strain Used | Control | Glucose | N | O |
|---|---|---|---|---|---|
| *Clostridium* | | | | | |
| butyricum | GAI# 7503 | − | +++ | + | ++ |
| butyricum | CIFL N0065 | − | +++ | + | ++ |
| cadaveris | CIFL N0047 | − | + | − | − |
| clostridioforme | GAI# 5458 | − | + | − | − |
| clostridioforme | CIFL N0062 | − | + | − | − |
| difficile | GAI# 10038 | − | + | − | − |
| difficile | CIFL N0013 | − | + | − | − |
| difficile | GAI# 10042 | − | ± | − | − |
| difficile | GAI# 10037 | − | ++ | − | − |
| hystlyticum | CIFL N0071 | − | − | − | − |
| innocuum | GAI# 5472 | − | +++ | − | − |
| novyi (Type A) | GAI# 5614 | − | ++ | − | − |
| paraputrificum | CIFL N0061 | − | +++ | − | − |
| paraputrificum | CIFL N0098 | − | ++ | − | − |
| perfringens | GAI# 5526 | − | ++ | − | − |
| perfringens | CIFL N0054 | − | ++ | − | − |
| perfringens | CIFL N0091 | − | + | − | − |
| perfringens | CIFL N0092 | − | ++ | − | − |
| perfringens | CIFL N0096 | − | ++ | − | − |
| ramosum | CIFL N0048 | − | ++ | − | − |
| ramosum | CIFL N0097 | − | +++ | − | ++ |
| septicum | GAI# 7502 | − | + | − | − |

TABLE 8-2-continued

| Name of Bacterium | Strain Used | Control | Glucose | N | O |
|---|---|---|---|---|---|
| tertium | GAI# 5618 | - | ++ | ± | ± |
| sordellii | GAI# 5612 | - | + | - | - |
| sporogenes | GAI# 5562 | - | ± | - | - |
| Eubacterium | | | | | |
| aerofaciens | CIFL N0070 | - | ++ | - | - |
| aerofaciens | CIFL N0095 | - | +++ | - | - |
| lentum | CIFL N0059 | - | - | - | - |
| limosum | CIFL N0068 | - | +++ | - | - |
| limosum | CIFL N0104 | - | +++ | - | - |
| nitritogenes | CIFL N0085 | - | +++ | - | - |
| Fusobacterium | | | | | |
| mortiferum | GAI# 5442 | - | + | - | - |
| varium | GAI# 5566 | - | + | - | - |
| varium | CIFL N0084 | - | + | - | - |
| Megamonas | | | | | |
| hypermegas | CIFL N0060 | - | +++ | - | + |
| Mitsuokella | | | | | |
| multiacida | CIFL N0105 | - | +++ | - | + |

TABLE 8-3

| Name of Bacterium | Strain Used | Control | Glucose | N | O |
|---|---|---|---|---|---|
| Peptostreptococcus | | | | | |
| magnus | GAI# 5528 | - | - | - | - |
| micros | GAI# 5540 | - | - | - | - |
| asaccharolytica | CIFL N0080 | - | ± | - | - |
| prevotii | CIFL N0081 | - | - | - | - |
| Propionibacterium | | | | | |
| acnes | GAI# 5468 | - | +++ | - | - |
| granulosum | CIFL N0083 | - | ++ | - | - |
| Veillonella | | | | | |
| parvula | GAI# 5602 | - | - | - | - |
| parvula | CIFL N0087 | - | - | - | - |
| Citrobacter | | | | | |
| diversus | CIFL A0016 | - | + | - | - |
| freundii | CIFL A0015 | - | ++ | - | - |
| Enterobacter | | | | | |
| cloacae | CIFL A0001 | - | ± | - | - |
| Enterococcus | | | | | |
| faecalis | CIFL A0013 | - | +++ | ± | + |
| faecalis | CIFL A0033 | - | +++ | - | ± |
| faecalis | CIFL A0035 | - | +++ | ± | ++ |
| faecium | CIFL A0034 | - | +++ | - | ± |
| faecium | CIFL A0036 | - | +++ | - | ± |
| Escherichia | | | | | |
| coli | CIFL A0008 | - | ++ | - | - |
| coli | CIFL A0044 | - | + | - | - |
| coli | CIFL A0045 | - | ++ | - | - |
| coli | CIFL A0046 | - | +++ | - | - |
| coli | CIFL A0047 | - | ++ | - | - |
| Klebsiella | | | | | |
| pneumoniae | CIFL A0003 | - | ++ | - | - |
| pneumoniae | CIFL A0020 | - | + | - | ± |
| Lactobacillus | | | | | |
| acidophilus | CIFL A0038 | - | +++ | - | + |
| acidophilus | CIFL A0042 | - | +++ | - | ++ |
| casei | CIFL A0037 | - | +++ | - | + |
| casei | CIFL A0039 | - | +++ | - | ++ |
| fermentum | CIFL A0066 | - | +++ | - | - |
| fermentum | JCM 1173 | - | +++ | - | - |

TABLE 8-3-continued

| Name of Bacterium | Strain Used | Control | Glucose | N | O |
|---|---|---|---|---|---|
| gasseri | JCM 1131 | - | +++ | - | ++ |
| salivarius | CIFL A0041 | - | +++ | - | - |
| salivarius | CIFL A0043 | - | +++ | - | - |
| Morganella | | | | | |
| morganii | CIFL A0023 | - | + | - | - |
| Proteus | | | | | |
| mirabilis | CIFL A0009 | - | ++ | - | - |
| vulgaris | CIFL A0011 | - | ++ | - | - |
| Serratia | | | | | |
| marcescens | CIFL A0007 | - | ++ | - | - |
| Staphylococcus | | | | | |
| aureus | CIFL A0012 | - | +++ | - | - |
| epidermidis | CIFL A0018 | - | ++ | - | - |
| haemolyticus | CIFL A0014 | - | ++ | - | - |

Among Bacteroides strains, pathogenic *fragilis* showed an ability of assimilating the indigestible components inferior to an ability of glucose-assimilation. Other strains belonging to this genus likewise showed abilities of assimilating the indigestible components identical to or inferior to that observed for the *fragilis*.

Among Bifidobacterium strains, *adolescentis* and *breve* showed particularly high abilities of assimilating the indigestible components.

Among Clostridium strains, *butyricum* which is an effective bacterium having an intestinal function-controlling effect exhibited a high ability of assimilating the indigestible components, but pathogenic bacteria such as *perfringens* and *difficile* did not assimilate the indigestible components at all. Moreover, strains belonging to this genus other than the foregoing ones assimilated almost no indigestible components.

*Enterococcus faecalis* which has been known to have an intestinal function-controlling effect during, for instance, diarrhea slightly assimilated the indigestible components.

Among Lactobacillus strains, *acidophilus* having an intestinal function-controlling effect and *casei* capable of suppressing the functions of harmful bacteria assimilated the indigestible components.

The indigestible components were not assimilated by other pathogenic bacteria such as those belonging to Escherichia and Staphylococcus, at all.

Test Example 6

The preferential Bifidobacterium proliferation-promoting effect of the indigestible components of the acid-hydrolyzate was examined (in vivo) using the sample O prepared in Test Example 5.

The sample was administered to 7 male adults (43.3±5.0-year-old on the average) in an amount of 10 g/day (the amount of the indigestible components was 4.4 g) over 14 days, stools were collected from them prior to the ingestion of the sample, at 14 days after the initiation of the ingestion and 14 days after the termination of the ingestion and the stools were inspected for intestinal bacterial florae. These subjects were limited in the ingestion of foods such as dairy products and medicines such as antibiotics which may affect the intestinal bacterial florae during the testing period.

A sample (1 g) of each collected stool was weighed out, added to and uniformly admixed with 9 ml of a diluent to give each $10^{-1}$ diluent which was further stepwise diluted 10 times to give a series of diluents till the $10^{-8}$ diluent was obtained. Then 0.05 ml each of $10^{-5}$, $10^{-6}$ or $10^{-7}$ diluent was dropwise added to TS mediums; 0.05 ml each of $10^{-6}$, $10^{-7}$ or $10^{-8}$ diluent was dropwise added to EG and BL mediums; 0.05 ml each of $10^{-1}$, $10^{-3}$, $10^{-5}$ or $10^{-7}$ diluent was dropwise added to BS, NBGT, ES, NN, VS, LBS, TATAC, DHL, PEES and P mediums and uniformly smeared with spreader. Cultivation was carried out at 37° C. for 24 hours for the TS and DHL mediums and 37° C. for 72 hours for the TATAC, PEES and P mediums under the aerobic conditions, while the remaining mediums were anaerobically cultivated, in a Gas Pack (available from BBL Company) at 37° C. for 72 hours. After the cultivation, each culture medium was inspected for bacteria which were identified and classified on the basis of the shapes of colonies, the ability of gram staining and the morphology of cells. The number of bacteria per gram of each stool sample is summarized in Table 9 given below and the rate of the number of a specific bacterium on the basis of the total number of bacteria present in each stool is listed in the following Table 10.

TABLE 9

|  | Prior to Administration | During Administration | After Termination of Administration |
|---|---|---|---|
| Total | 10.7 ± 0.1 | 10.8 ± 0.1 | 10.8 ± 0.1 |
| Bacteroidaceae | 10.5 ± 0.1 | 10.5 ± 0.1 | 10.4 ± 0.1 |
| Eubacterium | 10.1 ± 0.1 | 10.2 ± 0.1 | 10.1 ± 0.1 |
| Bifidobacterium | 9.8 ± 0.2 | 10.1 ± 0.1 | 9.9 ± 0.1 |
| Peptococcaceae | 9.4 ± 0.2 | 9.6 ± 0.2 | 9.6 ± 0.2 |
| Streptococcus | 6.0 ± 0.7 | 6.8 ± 0.5 | 6.1 ± 0.6 |
| Enterobacteriaceae | 7.1 ± 0.3 | 7.3 ± 0.3 | 7.8 ± 0.3 |
| Lactobacillus | 6.5 ± 0.8 | 6.0 ± 1.1 | 5.0 ± 0.7 |
| Veillonella | 6.3 ± 0.5 | 6.5 ± 0.4 | 6.6 ± 0.6 |
| C. perfringens | 3.1 ± 0.6 | 3.2 ± 0.8 | 3.3 ± 0.4 |
| C. others | 9.1 ± 0.3 | 9.8 ± 0.1 | 9.6 ± 0.1 |
| Staphylococcus | 4.8 ± 0.5 | 2.3 | 2.3 |
| Yeasts | 3.4 ± 0.2 | 2.8 ± 0.5 | 3.7 ± 0.8 |

TABLE 10

|  | Prior to Administration | During Administration | After Termination of Administration |
|---|---|---|---|
| Bifidobacterium | 13.4 ± 2.2 | 19.8 ± 2.6 | 15.2 ± 1.4 |
| Bacteroidaceae | 54.9 ± 2.9 | 44.5 ± 2.4 | 49.3 ± 2.5 |
| Others | 31.7 ± 2.4 | 35.6 ± 3.4 | 35.5 ± 3.4 |

The results listed in Tables 9 and 10 indicate that the administration of the acid-hydrolyzate of pyrodextrin permits an increase in the number of Bifidobacterium, while the rate of occupation by Bacteroides is reduced, in other words, the administration thereof induces a change in the intestinal bacterial florae. Therefore, it is clear that the administration of the acid-hydrolyzate in an amount of 4.4 g/day as expressed in terms of the amount of the indigestible components is effective for promoting the proliferation of Bifidobacterium.

As seen from the results obtained in Test Examples 5 and 6, there was observed a significant difference between the numbers of Bifidobacterium prior to and during administration of the acid-hydrolyzate of the pyrodextrin at a risk rate of 5% as shown in Table 9. It is also clear that the acid-hydrolyzate shows a preferential Bifidobacterium-proliferation activity, promotes the formation of organic acids through the proliferation of Bifidobacterium, reduces the pH of the large intestine to thus suppress the growth of putrefactive bacteria such as Bacteroides, controls the generation of harmful substances produced by the putrefactive bacteria such as ammonia, phenol and indole and is thus effective for the improvement of the intestinal environment.

Reference Example 1

Hydrochloric acid (750 ppm) was added to and uniformly admixed with commercially available corn starch and the mixture was then heated at 160° C. for 20 minutes to give a pyrodextrin product having an indigestible component-content of 55.9%. This pyrodextrin was dissolved in water to give a 30% aqueous solution thereof and the pH of the solution was adjusted to 1.8 through addition of a 10% hydrochloric acid aqueous solution. The solution was transferred to an autoclave and then heated at 21° C. for 30 minutes to give a hydrolyzate. The hydrolyzate was subjected to discoloration with active carbon, followed by filtration, a desalting treatment with an ion-exchange resin, concentration to 50% and finally spray-drying to give a powdery product.

Reference Example 2

The pyrodextrin used in Reference Example 1 was heat-treated at 121° C. for 40 minutes to give a hydrolyzate in the same manner used in Reference Example 1. The hydrolyzate was purified in the same manner used in Reference Example 1 and then concentrated to 75% to give a liquid product.

Reference Example 3

Hydrochloric acid (750 ppm) was added to and uniformly admixed with commercially available potato starch and the mixture was then heated at 175° C. for 120 minutes to give a pyrodextrin product having an indigestible component-content of 56.9%. This pyrodextrin Was dissolved in water to give a 30% aqueous solution thereof and the pH of the solution was adjusted to 1.8 through addition of a 10% hydrochloric acid aqueous solution. The solution was transferred to an autoclave and then heated at 121° C. for 20 minutes to give a hydrolyzate. The hydrolyzate was purified in the same manner used in Reference Example 1 and then spray-dried to give a powdery product.

Reference Example 4

The pyrodextrin used in Reference Example 3 was heat-treated at 121° C. for 40 minutes to give a hydrolyzate in the same manner used in Reference Example 3. The hydrolyzate was purified in the same manner used in Reference Example 2 and then concentrated to give a liquid product.

The hydrolyzates prepared in the foregoing Reference Examples were analyzed and inspected for the assimilation by Bifidus "Amano" 100 (Product name of *Bifidobacterium longum*, product of Amano Pharmacy Co.). The results thus obtained are listed in the following Table 11.

TABLE 11

| Reference Ex. No. | Amount of Glucose (%) | DE Value | $MW_{av}$ | I.D. Comp. (%) | Ability of Assimilation |
|---|---|---|---|---|---|
| 1 | 13.3 | 29.7 | 886 | 42.3 | ++ |
| 2 | 15.2 | 34.7 | 856 | 39.5 | ++ |
| 3 | 13.5 | 26.1 | 904 | 42.0 | + |
| 4 | 17.8 | 38.7 | 899 | 39.0 | ++ |

In the present invention, the acid hydrolyzate of pyrodextrin has physical properties almost identical to those of the conventional starch syrup and starch syrup solid except for the foregoing Bifidobacterium proliferation-promoting effect and therefore, the hydrolyzate can be used in applications, in which the conventional starch syrup and powdered starch syrup can also be used, in the same manner.

The present invention will hereunder be explained in more detail with reference to the following non-limitative working Examples. In the following Examples, the term "part" means "part by weight".

Example 1

Raw materials were mixed in a compounding ratio listed in Table 12 to form a solution, then condensed till the temperature of the solution reached 180° C., 5 g each of the condensate was poured into a mold and allowed to cool to give a piece of hard candy. Six pieces of candy thus prepared comprise, in total, 4.2 g of indigestible components.

TABLE 12

| Raw Material | Amount (part) |
| --- | --- |
| Sugar | 60 |
| Hydrolyzate of Reference Example 1 | 30 |
| Water | 30 |

Example 2

According to the compounding ratio listed in Table 13, starch syrup was added to water, followed by heating up to 80° C., then addition of all of the remaining raw materials, condensation of the mixture till the temperature thereof reached 180° C. and transferring to a tray while cooling to form into caramels each having a weight of 5 g. Seven caramels thus prepared comprise, in total, 4.3 g of indigestible components.

TABLE 13

| Raw Material | Amount (part) |
| --- | --- |
| Hydrolyzate of Reference Example 4 | 36 |
| Sugar-Containing Condensed Milk | 50.9 |
| Wheat Flour | 5.9 |
| Common Salt | 0.2 |
| Shortening | 7.0 |
| Water | 20.0 |

Example 3

According to the compounding ratio shown in Table 14, a bubble gum base and poly(vinyl acetate) were mixed in a small-sized kneader, the other raw materials were in order added to and mixed with the gum base and poly(vinyl acetate), followed by stirring till a uniform mixture was obtained, allowing to cool down to 20° C. and then forming into sheets of bubble gum each having a weight of 7 g. Seven sheets of the bubble gum thus prepared comprise, in total, 4.1 g of indigestible components.

TABLE 14

| Raw Material | Amount (part) |
| --- | --- |
| Bubble Gum Base | 30.0 |
| Hydrolyzate of Reference Example 4 | 25.0 |
| Glucose | 4.0 |

TABLE 14-continued

| Raw Material | Amount (part) |
| --- | --- |
| Sorbitol | 4.0 |
| Powder Sugar | 33.0 |
| Glycerin | 2.0 |
| Poly(vinyl acetate) | 2.0 |

Example 4

According to the compounding ratio shown in the following Table 15, all of the raw materials were sufficiently dispersed in water and heated to 95° C. with stirring and then cooled to 30° C. to give a cream filling. The filling comprises indigestible components in an amount of 4.9 g per 70 g of the former.

TABLE 15

| Raw Material | Amount (part) |
| --- | --- |
| Hydrolyzate of Reference Example 3 | 16.5 |
| Sucrose | 13.0 |
| Water | 45.5 |
| Modified Starch | 7.0 |
| Skimmed Milk | 2.0 |
| Margarine | 12.0 |

Example 5

According to the compounding ratio shown in the following Table 16, all of the raw materials were mixed with water and heated to 80° C., and then cooled to 30° C.. After pre-emulsifying, the mixture was subjected to main-emulsification, followed by aging for 24 hours, quenching by freezing, storage in a refrigerator to give ice cream. Two cups of the ice cream (80 g each) comprise 4.3 g of indigestible components.

TABLE 16

| Raw Material | Amount (part) |
| --- | --- |
| Butter | 6.5 |
| Sugar-Containing Condensed Milk | 8.0 |
| Skimmed Milk | 6.4 |
| Hydrolyzate of Reference Example 3 | 6.4 |
| Sugar(sucrose) | 6.5 |
| Emulsion Stabilizer | 0.7 |
| Water | 65.3 |

Example 6

According to the compounding ratio shown in the following Table 17, finely divided strawberries and a half of the sugar component were added to water and the mixture was condensed with a feeble flame, followed by evaporation of water, addition of the remaining half of the sugar component, pectin and citric acid with sufficient stirring, condensation of the mixture till the weight of the whole was equal to 80 parts and allowing to cool to give strawberry jam. The strawberry jam comprises indigestible components in an amount of 4.3 g per 50 g of the former.

TABLE 17

| Raw Material | Amount (part) |
| --- | --- |
| Strawberry | 50.0 |
| Sugar(sucrose) | 23.7 |
| Hydrolyzate of Reference Example 1 | 18.8 |
| Pectin | 1.0 |
| Citric Acid | 0.3 |
| Water | 26.2 |

As has been discussed above in detail, the present invention permits the impartation of Bifidobacterium proliferation-promoting effect to foods. Therefore, the present invention can provide very excellent health foods.

What is claimed is:

1. An agent for promoting the proliferation of bifidobacterium which comprises an indigestible substance which is prepared by heating a starch in the presence of a mineral acid and a small amount of water to prepare a pyrodextrin and hydrolyzing the pyrodextrin in the presence of an organic acid or an inorganic acid, wherein the indigestible substance has a dextrose equivalent value of from 17 to 44 and the average molecular weight of indigestible components in the indigestible substance is not more than 1085.

2. The agent of claim 1 wherein the pyrodextrin is prepared by mixing starch with 3 to 10% by weight of an aqueous solution of hydrochloric acid containing 1% by weight of hydrochloric acid, pre-drying the resulting mixture to obtain a mixture containing water in the amount of 0.1 to 7% by weight, and then heating at a temperature of 140° to 200° C. for 10 to 120 minutes.

3. The agent of claim 2 wherein the indigestible substance is prepared by hydrolyzing the pyrodextrin in the presence of an acid at a temperature of 120° to 140° C. for 15 to 60 minutes.

4. The agent of claim 3 wherein the indigestible substance is prepared by hydrolyzing the pyrodextrin in the presence of hydrochloric acid or oxalic acid at a pH of 1.6 to 2.0.

5. The agent of claim 1 wherein the indigestible substance is contained in a food.

6. The agent of claim 5 wherein the food is selected from the group consisting of candy, caramel, chewing gum, cream filling, ice cream, jam, jelly, pudding, meringue, sherbet, (fruits) compote and marsh mallow.

7. The agent of claim 1 wherein the pyrodextrin contains indigestible components in an amount of 30 to 60% by weight.

8. The agent of claim 1 wherein the indigestible substance has a DE value ranging from 17 to 44 and the average molecular weight of the indigestible components is not more than 1085.

9. The agent of claim 1 wherein the Bifidobacterium is selected from the group consisting of *Bifidobacterium adolescentis*, *Bifidobacterium breve* and *Bifidobacterium longum*.

10. A method for promoting the proliferation of Bifidobacterium in the intestine by introducing into the intestine an indigestible substance which is prepared by heating a starch in the presence of a mineral acid and a small amount of water to prepare a pyrodextrin and hydrolyzing the pyrodextrin in the presence of an organic acid or an inorganic acid, wherein the indigestible substance has a dextrose equivalent value of from 17 to 44 and the average molecular weight of indigestible components in the indigestible substance is not more than 1085.

* * * * *